US011383791B2

(12) United States Patent
Deleval et al.

(10) Patent No.: US 11,383,791 B2
(45) Date of Patent: Jul. 12, 2022

(54) POWERTRAIN

(71) Applicant: E2 DRIVES, Louvain-la-Neuve (BE)

(72) Inventors: Arthur Deleval, Overijse (BE); Simon Godfrind, Ixelles (BE)

(73) Assignee: E2 DRIVES, Genval (BE)

( * ) Notice: Subject to any disclaimer, the term of this patent is extended or adjusted under 35 U.S.C. 154(b) by 129 days.

(21) Appl. No.: 16/643,088

(22) PCT Filed: Aug. 30, 2018

(86) PCT No.: PCT/EP2018/073399
§ 371 (c)(1),
(2) Date: Feb. 28, 2020

(87) PCT Pub. No.: WO2019/043123
PCT Pub. Date: Mar. 7, 2019

(65) Prior Publication Data
US 2020/0198727 A1     Jun. 25, 2020

(30) Foreign Application Priority Data

Aug. 30, 2017 (BE) .................................. 2017/5605

(51) Int. Cl.
*B62M 6/55* (2010.01)
*B62M 6/50* (2010.01)
*B62M 11/14* (2006.01)

(52) U.S. Cl.
CPC ................ *B62M 6/55* (2013.01); *B62M 6/50* (2013.01); *B62M 11/145* (2013.01)

(58) Field of Classification Search
CPC ........ B62M 11/145; B62M 6/50; B62M 6/55; F16D 41/24
See application file for complete search history.

(56) References Cited

U.S. PATENT DOCUMENTS

| 9,254,890 B2 | 2/2016 | Deleval |
| 2017/0217537 A1 | 8/2017 | Yamamoto |
| 2017/0274963 A1* | 9/2017 | Yamamoto ............. B62M 11/14 |

FOREIGN PATENT DOCUMENTS

| DE | 102017201325 A1 | 8/2017 |
| EP | 2841328 A1 | 3/2015 |
| EP | 2924317 A1 | 9/2015 |
| WO | 2013160477 A1 | 10/2013 |

(Continued)

OTHER PUBLICATIONS

International Search Report dated Sep. 25, 2018, issued in corresponding International Application No. PCT/EP2018/073399, filed Aug. 30, 2018, 7 pages.

(Continued)

*Primary Examiner* — Ernesto A Suarez
*Assistant Examiner* — Lori Wu
(74) *Attorney, Agent, or Firm* — Christensen O'Connor Johnson Kindness PLLC

(57) ABSTRACT

A powertrain for a pedal vehicle includes a crank axle and an output sprocket rotating around a first rotation axis. The coupling between the crank axle and the output sprocket goes through an epicyclic gear system that includes a ring gear, a planet carrier, and a sun gear (13) which rotate around a second rotation axis that is spatially offset from the first rotation axis.

18 Claims, 6 Drawing Sheets

(56) References Cited

FOREIGN PATENT DOCUMENTS

WO      2016034574  A1      3/2016

OTHER PUBLICATIONS

Written Opinion of the International Searching Authority dated Sep. 25, 2018, issued in corresponding International Application No. PCT/EP2018/073399, filed Aug. 30, 2018, 6 pages.
Written Opinion of the International Searching Authority dated Sep. 25, 2018, issued in corresponding International Application No. PCT/EP2018/073399, filed Aug. 30, 2018, 5 pages.
International Preliminary Report on Patentability dated Mar. 3, 2020, issued in corresponding International Application No. PCT/EP2018/073399, filed Aug. 30, 2018, 1 page.

* cited by examiner

POWERTRAIN

TECHNICAL FIELD

The present invention relates to a powertrain for a pedal vehicle, particularly for bicycle or electric bicycle.

PRIOR ART

The document WO2016/034574 describes a powertrain for bicycle comprising a epicyclic gear system, a crank axle, an output sprocket, a first motor and a second motor. The epicyclic gear system comprises a ring gear, a sun gear and a planet carrier.

In this system, the planet carrier comprises double-planets, which is complex to be produced, to be assembled and expensive.

SUMMARY OF THE INVENTION

One of the aims of the invention is to provide a powertrain for a pedal vehicle that is simple to fabricate, lightweight, robust and of compact size.

For this purpose, the invention proposes a powertrain for a pedal vehicle and comprising:
- a crank axle arranged to rotate around a first rotation axis,
- an output sprocket arranged to rotate around the first rotation axis,
- a first motor,
- a second motor,
- a epicyclic gear system including a first gearing element, a second gearing element and a sun gear, the crank axle and the second motor being connected to the epicyclic gearset via the first gearing element as to form a first input to the epicyclic gearset, the first motor being connected to the epicyclic gearset via the sun gear as to form a second input to the epicyclic gearset, the second gearing element connecting the epicyclic gearset to the output sprocket as to form an output from the epicyclic gearset, wherein the first gearing element, the second gearing element and the sun gear are arranged to rotate around a second rotation axis different from the first rotation axis.

In the powertrain according to the invention, the first gearing element, the second gearing element and the sun gear have a rotation axis spatially offset from the rotation axis of the crank axle and the output sprocket. This allows the size of the sun ring to be independent from the diameter of the crank axle. This also allows to install a sun gear of smaller diameter and consequently, to increase the epicyclic gear ratio. Hence, it is possible to get a sufficient ratio for the epicyclic gearset without using double-planets. This allows the powertrain to be easier to fabricate, to assemble and to become cheaper.

The powertrain according to the invention also allows to obtain a big reduction ratio between the first motor and the output sprocket. Indeed, this reduction ratio depends on the epicyclic gearset ratio and on the reduction ratio between the second gearing element and the output sprocket.

One advantage of the powertrain is that it allows to obtain a gear ratio between the crank axle and the first gearing element of the epicyclic gearset. Consequently, all the elements of the epicyclic gearset rotate faster and with less torque. This decreases the mechanical stress that they sustain.

Another advantage of the powertrain according to the invention is that it is possible to easily place a position sensor in the center of the first motor axle because this latter is different from the crank axle.

Another advantage of the powertrain according to the invention is that the first motor can be relatively simple because its axle is different from the crank axle.

Another advantage of the powertrain according to the invention is that it combines electrical assistance and an automatic gearbox inside a same housing.

Another advantage of the powertrain according to the invention is that it provides a continuously variable transmission ratio.

The fact that the crank axle and the output sprocket have the same rotation axis allows that the crank axle is not in the way of the chain that links the output sprocket to the rear wheel. This allows the chain to be short. This also gives significant latitude for the positioning of the powertrain on the pedal vehicle. Moreover, this allows to minimize the space between the crank axle and the rear wheel which gives a better maneuverability to the pedal vehicle.

Preferably, the powertrain comprises at least one of the following measurement elements:
- an element of measurement of an angular position of the first motor,
- an element of measurement of an angular position of the second motor,
- an element of measurement of a current of the first motor, and
- an element of measurement of a current of the second motor.

Preferably, the powertrain comprises a control unit connected to the first motor, to the second motor and configured to control the first motor and the second motor according to the angular position of the first motor, to the angular position of the second motor, to the current of the first motor and to the current of the second motor, the control unit being configured to control the second motor according to a current or torque control.

It is interesting to note that there is no fundamental difference between a position control and a speed control because there is a direct mathematical relationship between the two values. The angular speed is the time derivative of the angular position. For example, controlling a motor so that it rotates at a constant angular speed is the same as controlling a motor so that it follows an angular position that evolves linearly in function of time.

Preferably, the first rotation axis and the second rotation axis are parallel. Preferably, the rotation axis of the second motor is also parallel with them.

In the frame of this document, two connected or linked elements can be directly or indirectly connected or linked. For example, they can directly or indirectly mesh via at least one intermediary toothed wheel, belt and/or roller.

In the frame of this document, the terms «input» and «output» should be understood in the sense of an input and an output within a kinetic chain. An input is preferably a mechanical power input and an output is preferably a mechanical power output.

In the frame of this document, the epicyclic gearset ratio is the reduction of the epicyclic gearset. In the case of a epicyclic gearset with single planets, it is the ratio between the diameter of the ring gear and the diameter of the sun gear.

In the frame of this document, a pedal vehicle can for example be a bicycle, a moped, a tricycle.

In the frame of this document, a gearing element can for example be a toothed wheel or a plurality of toothed wheels mechanically torqued or meshed between them.

In the frame of this document, an element «arranged to rotate around a rotation axis» is preferably an element mainly symmetric around this axis.

In the frame of this document, a «fixed ratio» between two objects means that their rotation speeds are in a constant ratio.

In the frame of this document, the «gear ratio of the powertrain» refers to the gear ratio existing between the crank axle and the output sprocket.

In the frame of this document, the «assistance level of the powertrain» refers to the power portion given by the electrical assistance against the power given by the cyclist. It can be calculated as the power of the two motors sand divided by the sum of the power of the two motors sand and the cyclist power. It can also be called «assistance level parameter». It is a parameter that can be controlled manually by the cyclist via a control interface or computed automatically by the control unit in function of other parameters.

In the frame of this document, a double-planet includes a large toothed wheel and small toothed wheel that are attached concentrically and in fixed manner.

In the frame of this document, a measurement of the angular position is equivalent to a measurement of the angular speed. Indeed, the powertrain according to the invention preferably includes a mean to determine the angular speed of one of the motors from the angular position of this motor.

In the frame of this document, a measurement of the current is equivalent to a measurement of the torque. Indeed, the powertrain according to the invention preferably includes a mean to determine the torque of one of the motors from the current supplied to this motor.

The epicyclic gear system includes a ring gear, a planet carrier and a sun gear. The planet carrier includes planets. The sun gear can also be called inner sun gear or sun. The ring gear can also be called outer ring gear. The sun gear and the ring gear are preferably connected via the planets.

Preferably, the planet carrier only includes single planets. Indeed the powertrain according to the invention allows the avoidance of using double-planets.

The first motor includes a rotor and a stator. The second motor includes a rotor and a stator. the rotor of the first motor is connected to the epicyclic gearset via the sun gear. the rotor of the second motor is connected to the epicyclic gearset via the first gearing element.

Preferably, the rotor of the first motor is arranged to rotate according to the second rotation axis. Preferably, the rotor of the second motor is arranged to rotate according to a third rotation axis, which is different from the first rotation axis and from the second rotation axis.

Preferably, the powertrain includes a printed circuit board on which the control unit is placed.

Preferably, the powertrain includes one or several batteries.

Preferably, the output sprocket is fixed to a hollow shaft arranged around the crank axle and coaxial to the crank axle.

In an embodiment of the invention, the output sprocket is linked, preferably by a chain, a shaft transmission or a belt, to a rear wheel pinion of the pedal vehicle.

The rotation of the crank axle comes from the pedalling movement of a cyclist using a pedal vehicle. The use of a epicyclic gearset taking the crank shaft as input allows a change of the gear ratio between the rotation provided by the cyclist and the rotation of the output sprocket.

In an embodiment of the invention, the role of the first motor is to manage the gear ratio of the powertrain. One of its functions is to offer a given transmission ratio. This transmission ratio is the ratio between the angular speed of the crank axle and the angular speed of the output sprocket. For example, this transmission ratio can be determined based on the speed ratio parameter provided by the pedal vehicle user or determined by the control unit in order to offer an automatic gear shifting to the cyclist. This determining can be achieved by a gear shifting algorithm. The first motor is preferably controlled by angular position or by angular speed, for example via the control unit that controls the first motor so that an angular position or angular speed setpoint is respected.

In an embodiment of the invention, the role of the second motor is to manage the right assistance level of the powertrain. One of its functions is to assist the cyclist movement by adding torque to the crank. Preferably, the assistance level is determined by the control unit based on among others an assistance level parameter. The assistance level parameter can be determined by the user or automatically by the control unit of the powertrain. It is preferred that the assistance level is independent from the gear ratio of the powertrain. The second motor is preferably controlled by courant or by torque, for example via the control unit that controls the second motor so that a current or torque setpoint is respected.

Preferably, the control unit is electrically connected to the measurement element of an angular position of the first motor, to the measurement element of an angular position of the second motor, to the measurement element of a current supplied to the first motor, and to the measurement element of a current supplied to the second motor.

The control of first and second motors can for example be made the following way in the first embodiment of the invention.

The angular speed of the bicycle rear wheel $\omega_R$ is proportional to the angular speed of the output sprocket $\omega_{plat}$:

$$\omega_R = R_R \cdot \omega_{plat}$$

With $R_R$ the transmission ratio between the angular speed of the bicycle rear wheel and the angular speed of the output sprocket.

The angular speed of the output sprocket is given by:

$$\omega_{plat} = \frac{1}{R_{out}} \left( \frac{\omega_{M1} + R \cdot R_C \cdot \omega_{ped}}{R+1} \right)$$

Where $R_{out}$ is the ratio between the planet carrier and the output sprocket, $R_C$ is the ratio between the crank axle and the ring gear, $\omega_{M1}$ is the angular speed of the first motor, $\omega_{ped}$ is the angular speed of the crank and R is the reduction ratio of the epicyclic gearset.

The crank angular speed can be determined from a measured angular speed of the second motor $\omega_{M2}^{mes}$ by $$\omega_{ped} = \frac{\omega_{M2}^{mes}}{R_{M2} \cdot R_C}$$

Where $R_{M2}$ is the reduction ratio between the second motor and the ring gear.

The control unit relies on a speed ratio parameter GC (for Gear Coefficient in English) and on a measured angular speed second motor $\omega_{M2}^{mes}$ to determine the angular speed imposed to the first motor $\omega_{M1}^{cons}$ $$\omega_{M1}^{cons} = GC \cdot \omega_{ped} \cdot R_C = GC \cdot \frac{\omega_{M2}^{mes}}{R_{M2}}$$

so that the angular speed of the rear wheel is proportional to the angular speed of the crank when the parameter GC is constant $$\omega_R = \frac{R_R}{R_{out}} \cdot \frac{\omega_{M1}^{cons} + R \cdot R_C \cdot \omega_{ped}}{R+1} = \frac{R_R}{R_{out}} \cdot \frac{GC \cdot \frac{\omega_{M2}^{mes}}{R_{M2}} + R \cdot R_C \cdot \omega_{ped}}{R+1} =$$
$$\frac{R_R}{R_{out}} \cdot \frac{GC \cdot R_C \cdot \omega_{ped} + R \cdot R_C \cdot \omega_{ped}}{R+1} = \frac{R_R \cdot R_C}{R_{out}} \cdot \left(\frac{GC+R}{R+1}\right) \cdot \omega_{ped}$$

$\omega_{M1}^{cons}$ is therefore an angular speed setpoint imposed to the first motor. In the same way, it is possible to position control the first motor by assigning it a position setpoint which value is simply the integral of this speed setpoint $\omega_{M1}^{cons}$.

The torque of the first motor $C_{M1}$ is given by $$C_{M1} = \frac{C_{ped}}{R \cdot R_c} = \frac{C_{plat}}{(R+1) \cdot R_{out}}$$

Where $C_{ped}$ is the crank torque and $C_{plat}$ is the output sprocket torque.

We can consider an assistance level parameter AF (for Assistance Factor in English), for example equal to the ratio of the electrical power to the total energy supplied to the output sprocket $$AF = \frac{P_{M1} + P_{M2}}{P_{M1} + P_{M2} + P_{humain}}$$

By taking into account that the power is equal to the torque multiplied by the angular speed, it is possible to determine the torque of second motor that is adequate to reach the desired assistance level parameter, based on the first motor torque $C_{M1}$, from the equation $$AF = \frac{GC + \frac{R_{M2} \cdot C_{M2}}{C_{M1}}}{GC + R} \Rightarrow C_{M2}^{cons} = \frac{C_{M1}^{mes} \cdot (AF(GC+R) - GC)}{R_{M2}}$$

$C_{M2}^{cons}$ is therefore a torque or current setpoint imposed to the second motor.

Preferably, the motors control is a control with information feedback, also called feedback control.

The powertrain according to the invention can operate as coaster brake, which allows to recover the braking energy to recharge the battery. Preferably, the powertrain is then arranged so that the rear wheel is able to drive the chain as to transmit the movement onto the output sprocket. This can for example be done by installing the pinion of the rear wheel in a fixed way on the hub of the rear wheel. Therefore, if the pedal vehicle goes down a slope, the chain rotates and drives the output sprocket. This will cause the first motor and/or the crank to rotate in the normal direction of operation. If the cyclist wishes to brake, he can activate the crank backwards, that is to say in the opposite direction to the normal direction of operation. The crank position can be determined by the angular position measurement element of the second motor, for example by means of the second sensor. Preferably, the second motor is not controlled by the control unit. Preferably, the first motor is controlled by torque or by current, with a negative torque setpoint which corresponds to the fact that the motor acts as a generator. This negative torque setpoint is preferably proportional to a negative angle performed by the crank The measurement of this angle is set to zero at the moment when the cyclist activates the crank backwards. Therefore, at the moment when the cyclist activates the crank backwards, the first motor starts to brake the bicycle. Consequently, the cyclist feels a torque proportional to the braking torque of the first motor, leading the crank to return frontwards. It is therefore a stable system. The more the cyclist pushes backwards, the more the first motor brakes. If the cyclist releases the backwards pressure on the crank, the crank returns frontwards and the first motor stops to brake the bicycle. If the output sprocket is connected to the planet carrier, this latter acts as a differential. Consequently, it tends to rotate the first motor in the normal direction of operation. At this moment, the first motor is controlled as a generator to brake the bicycle and therefore transmits power to the battery. This system can for example be activated by a backpedalling, like the torpedo system. The brake power and consequently, the amount of energy supplied to the battery can be controlled according to the backpedalling force that the cyclist is applying.

In a first embodiment of the invention, the first gearing element is a ring gear of the epicyclic gearset and the second gearing element is a planet carrier of the epicyclic gearset.

According to this embodiment, the crank axle is connected, preferably with a fixed ratio, to the ring gear; the rotor of the second motor is connected, preferably with a fixed ratio, to the ring gear; the rotor of the first motor is connected, preferably with a fixed ratio, to the sun gear; the sun gear and the ring gear form two inputs to the epicyclic gearset; the planet carrier forms an output of the epicyclic gearset; the planet carrier is connected, preferably with a fixed ratio, to the output sprocket.

In a second embodiment of the invention, the first gearing element is a planet carrier of the epicyclic gearset and the second gearing element is a ring gear of the epicyclic gearset.

According to this embodiment, the crank axle is connected, preferably with a fixed ratio, to the planet carrier; the rotor of the second motor is connected, preferably with a fixed ratio, to the planet carrier; the rotor of the first motor is connected, preferably with a fixed ratio, to the sun gear; the planet carrier and the sun gear form two inputs of the epicyclic gearset; the ring gear form an output of the epicyclic gearset, the ring gear is connected, preferably with a fixed ratio, to the output sprocket.

In an embodiment of the invention, the crank axle is directly meshed with the first gearing element, and/or a rotor of the second motor is directly meshed with the first gearing element, and/or a rotor of the first motor is attached in a fixed manner to the sun gear, and/or the second gearing element is directly meshed with the output sprocket.

In an embodiment of the invention, the control unit is configured as to control the first motor according among others on a speed ratio parameter (GC).

In an embodiment of the invention, the control unit is configured as to determine a rotation speed setpoint and to impose said rotation speed setpoint to the first motor, the rotation speed setpoint being determined as directly proportional to the rotation speed of the second motor acquired by the angular position measurement element of the second motor and to the speed ratio parameter (GC).

In an embodiment of the invention, the control unit controls the second motor according among others to the speed ratio parameter (GC) and the assistance level parameter (AF) of the powertrain.

In an embodiment of the invention, the control unit is configured to determine a current or torque setpoint and to impose said current or torque setpoint to the second motor, the current or torque setpoint being determined as directly proportional to the torque or current of the first motor acquired by the current measurement element of the first motor and being determined according to the speed ratio parameter of the powertrain (GC) and to the assistance level parameter of the powertrain (AF).

In an embodiment of the invention, the crank axle and the first gearing element are connected so that the first gearing element rotates faster than the crank axle.

This allows a reduction (increasing the speed). Therefore, the epicyclic gearset sustain little mechanical stress because the torque is lower.

In an embodiment of the invention, the output sprocket and the second gearing element are connected so that the second gearing element rotates faster than the output sprocket.

This allows a reduction. Therefore, the epicyclic gearset sustain a relatively low torque.

In an embodiment of the invention, the second motor is connected to the first gearing element so that the first gearing element rotates slower than a rotor of the second motor. This allows to decrease the torque and increase the rotor rotation speed of the second motor and therefore minimize the size of the second motor.

In an embodiment of the invention, the powertrain includes among others a printed circuit board and the angular position measurement element of the first motor includes a first sensor, the angular position measurement element of the second motor includes a second sensor, the first sensor and the second sensor being preferably placed on the printed circuit board.

The printed circuit board is preferably plane.

Preferably, a first magnet is located at one extremity of the rotor rotation axis of the first motor. The first sensor is preferably placed in front of the first magnet. This allows to easily measure the angular position and/or the angular speed of the first motor.

Preferably, a second magnet is located at one extremity of the rotor rotation axis of the second motor. The second sensor is preferably placed in front of the second magnet This allows to easily measure the angular position and/or the angular speed of the second motor.

In an embodiment of the invention, the powertrain includes among others an one-way clutch located to allow a mechanical power transmission from the crank axle to the output sprocket. Different positions are possible for the first one-way clutch.

A function of the first one-way clutch is to allow a purely mechanical power transmission from the crank axle to the output sprocket, even if the motors are not running. Therefore, in case of motor failure, the cyclist can always pedal to go back home. Preferably, this operating mode corresponds to the smallest mechanical transmission ratio. This smallest mechanical transmission ratio is also used when the cyclist climbs a steep hill.

In a preferred embodiment of the invention, the first one-way clutch is located, preferably directly, between the crank axle and the output sprocket, so as to prevent the output sprocket from rotating slower than the crank axle.

This allows to avoid that the crank axle rotates faster than the output sprocket. In blocked position, the crank axle directly drives the output sprocket. In free position, the output sprocket can rotate faster than the crank axle. This position allows to reach a particularly low first gear ratio of the powertrain.

In an embodiment of the invention, the first one-way clutch is located between the ring gear and the planet carrier, so as to prevent the planet carrier from rotating slower than the ring gear.

In an embodiment of the invention, the first one-way clutch is located between the rotor of the first motor and a element that is fixed with respect to the frame of the vehicle, so as to prevent the rotor of the first motor to rotate in a direction. The element that is fixed with respect to the frame of the vehicle is for example a housing of the first motor or of the powertrain.

In an embodiment of the invention, the powertrain moreover includes a second one-way clutch placed so as to prevent a driving of the crank axle by the second motor in a rotation direction corresponding to a forward movement of the pedal vehicle.

The invention moreover proposes a pedal vehicle including a powertrain according to one of the embodiment of the invention.

BRIEF DESCRIPTION OF THE FIGURES

Other characteristics and advantages of the invention will appear when reading the below detailed description for the understanding of which we will refer to the annexed figures among which.

EMBODIMENTS OF THE INVENTION

The present invention is described with specific realization and references to figures, but the invention is not limited to them. The drawings or figures described are schematic only and are not limitative.

In the context of the present document, the terms «first» and «second» serve only to distinguish the different elements and do not involve any order between those elements.

On the figures, identical or similar elements may bear the same references.

Figure 1:
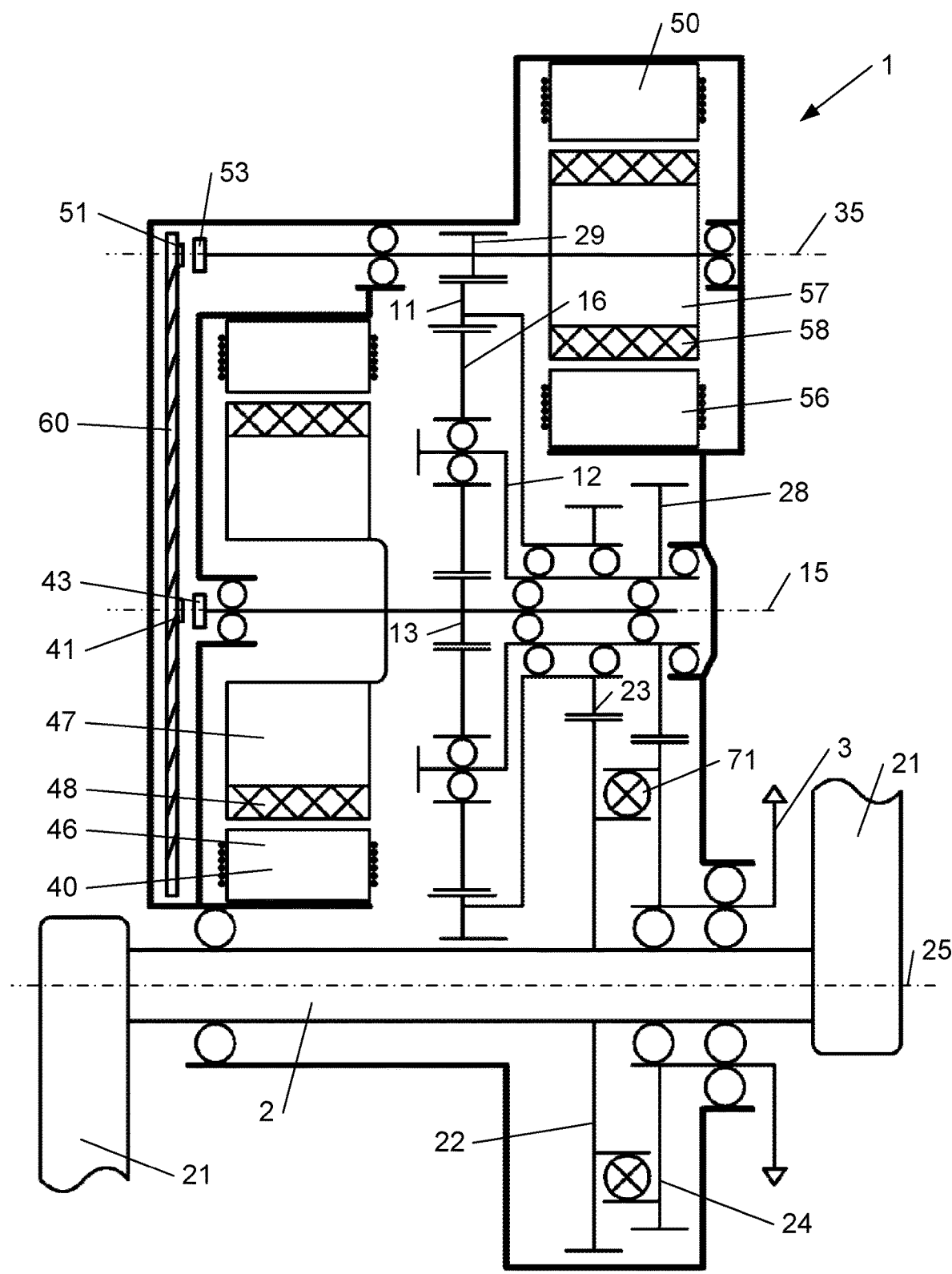
FIG. 1 illustrates a powertrain 1 according to a first variant of a first embodiment of the invention.
Figure 2:
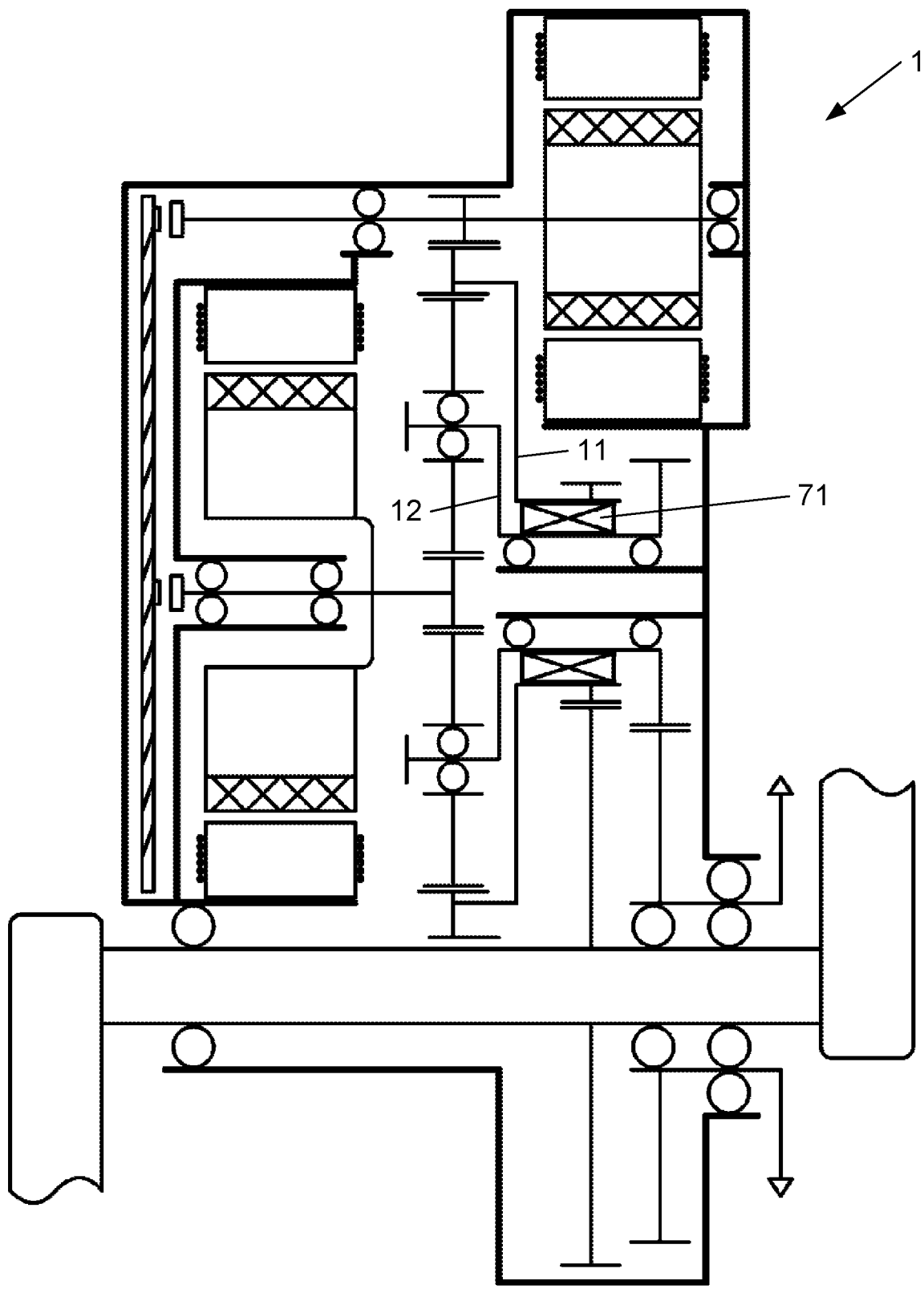
FIG. 2 illustrates a second variant of the first embodiment of the invention.
Figure 3:
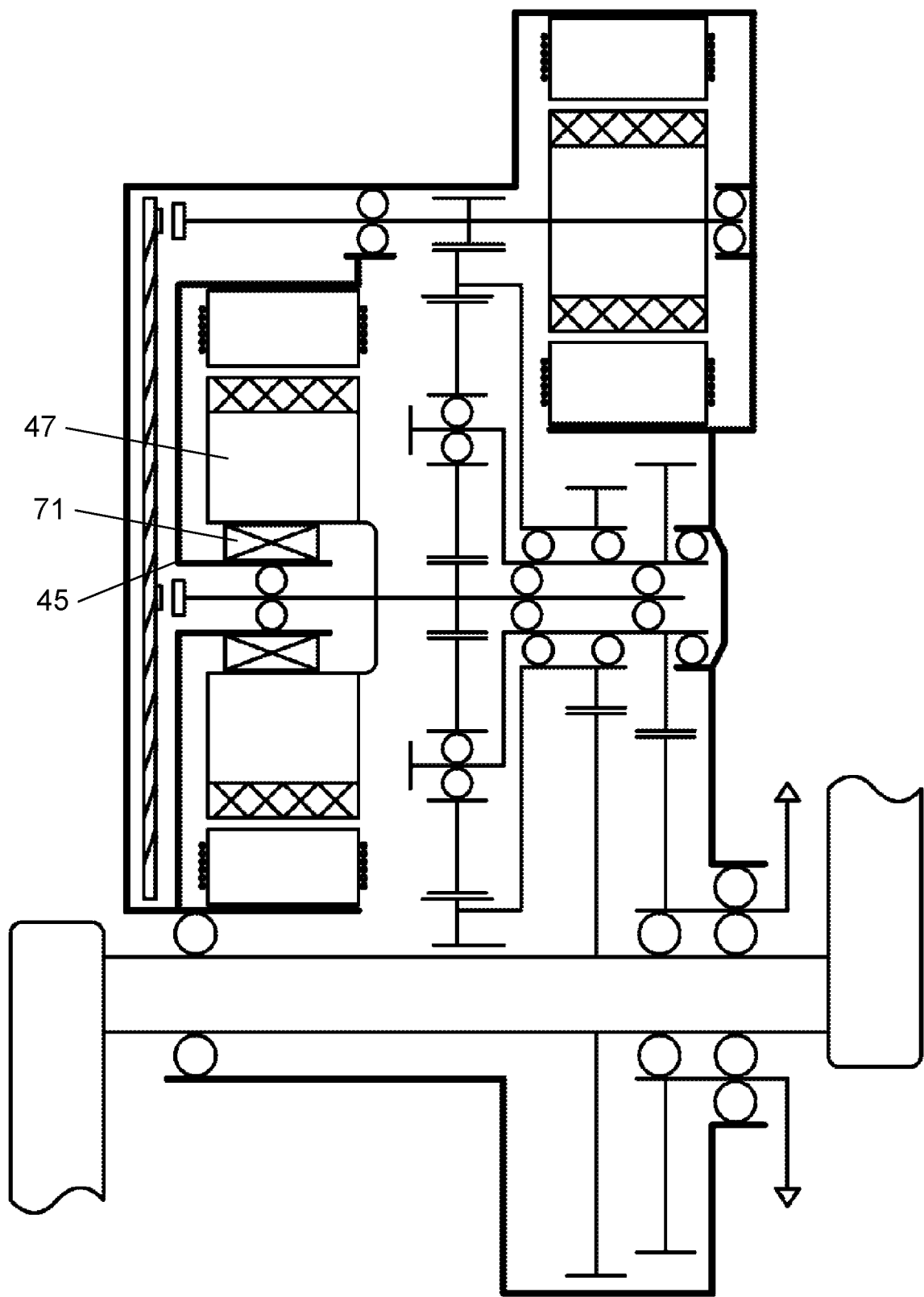
FIG. 3 illustrates a third variant of the first embodiment of the invention.
Figure 4:
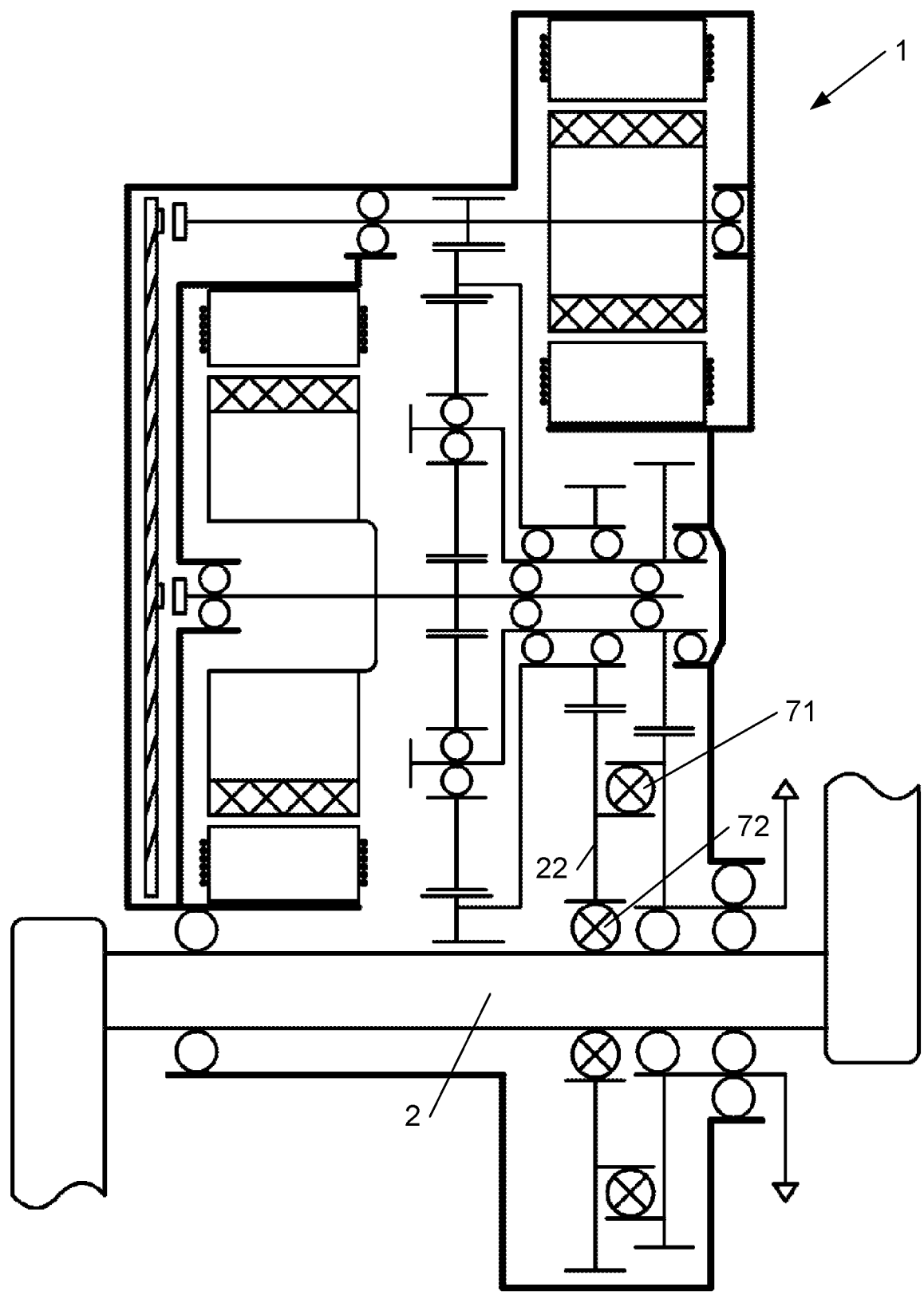
FIG. 4 illustrates a fourth variant of the first embodiment of the invention.
Figure 5:
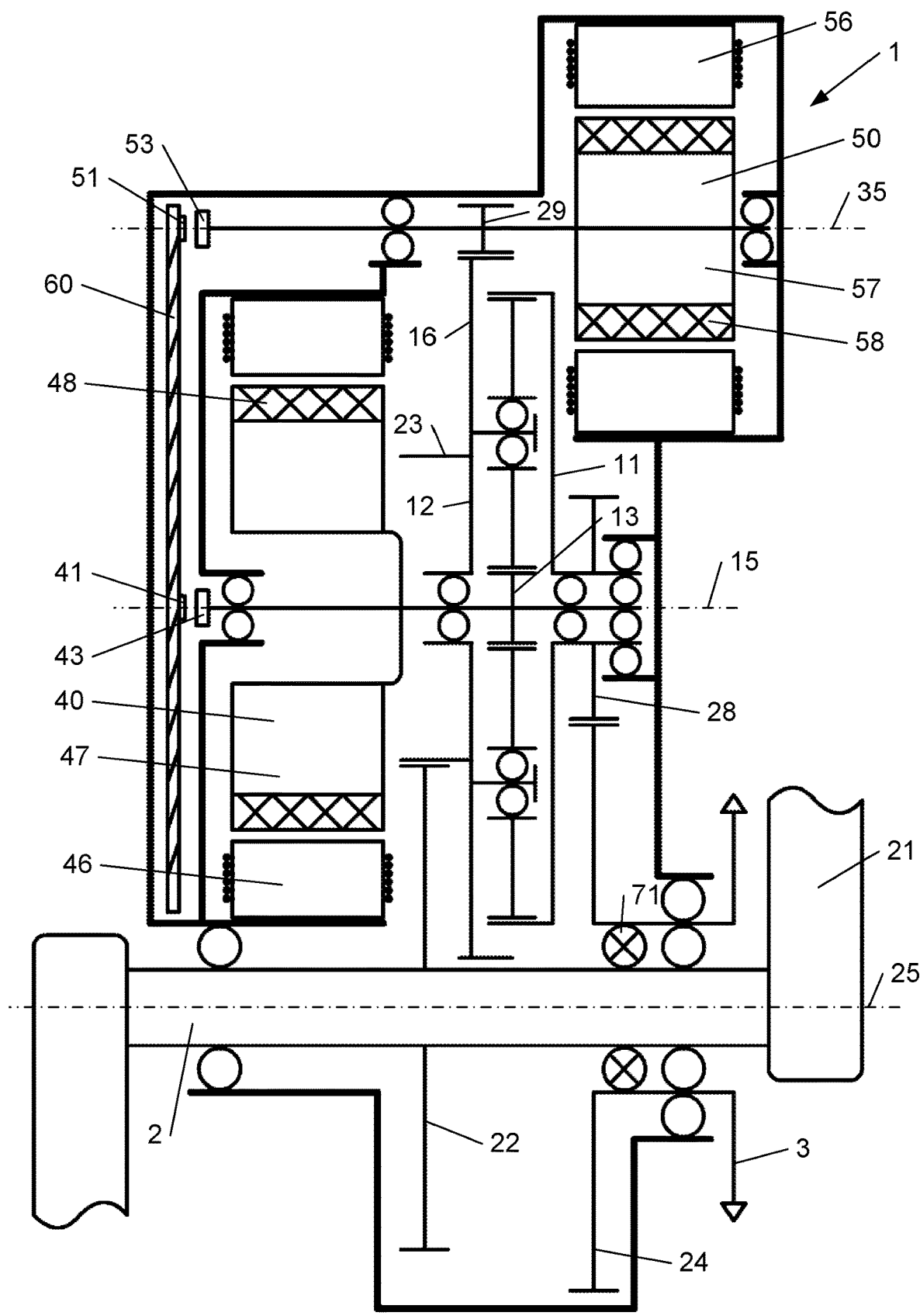
FIG. 5 illustrates a powertrain according to a second embodiment of the invention.

The FIGS. 1 to 4 illustrate a powertrain 1 according to four variants of a first embodiment of the invention. The FIG. 5 illustrates a powertrain 1 according to a second embodiment of the invention.

The powertrain 1 includes a crank axle 2 and an output sprocket 3 of same rotation axis 25. This axis can be called first rotation axis 25. Preferably, the crank axle 2 is fixed to two crank arms 21.

The powertrain 1 includes a first motor 40 and a second motor 50. The first motor 40 includes a stator 46 and a rotor 47 which includes magnets 48. The rotor 47 is arranged to rotate around a second rotation axis 15. The second motor 50 includes a stator 56 and a rotor 57 which includes magnets 58. The rotor 57 is arranged to rotate around a third rotation axis 35.

The powertrain 1 includes an element of measurement of a current of the first motor 40 and an element of measurement of a current of the second motor 50.

The powertrain 1 moreover includes a control unit, preferably fixed to a printed circuit board 60. The printed circuit 60 is preferably located perpendicular to the second 15 and to the third 35 rotation axis.

Preferably, a first magnet 43 is fixed to an extremity of the first motor shaft 40 and a second magnet 53 is fixed to an extremity of the second motor shaft 50.

Preferably, a first sensor 41 is fixed to the printed circuit board 60, approximately in line with the second rotation axis 15. The first sensor 41 and the first magnet 43 are part of an element of measurement of an angular position of the first motor 40.

Preferably, a second sensor 51 is fixed to the printed circuit board 60, approximately in line with the third rotation axis 35. The second sensor 51 and the second magnet 53 are part of an element of measurement of an angular position of the second motor 50.

The control unit controls the first motor 40 and the second motor 50 according to the angular position of the first motor 40, to the angular position of the second motor 50, to the current of the first motor 40 and to the current of the second motor 50, this information having been supplied to it by the measurement elements.

The control unit controls the second motor 50 by current or by torque. The control unit controls the first motor 40 by angular position or by angular speed.

The powertrain 1 includes an epicyclic gearset which includes a first gearing element, a second gearing element and a sun gear 13.

In the first embodiment of the invention (FIGS. 1 to 4), the first gearing element is a ring gear 11 and the second gearing element is a planet carrier 12. Preferably, the planet carrier 12 includes at least one planet 16. Preferably, the ring gear 11 is meshed on at least one planet 16. Preferably, the sun gear 13 is meshed on at least one planet 16.

In an embodiment of the invention, a first toothed wheel 22 is attached in a fixed manner to the crank axle 2. The first toothed wheel 22 is meshed with a second toothed wheel 23. The second toothed wheel 23 is attached in a fixed manner to the ring gear 11. Preferably, the first toothed wheel 22 has a greater diameter than the one of the second toothed wheel 23.

In an embodiment of the invention, a third toothed wheel 24 is attached in a fixed manner to the output sprocket 3. The third toothed wheel 24 is meshed with a fourth toothed wheel 28. The fourth toothed wheel 28 is attached in a fixed manner to the planet carrier 12, so as to rotate with the planet carrier 12. Preferably, the third toothed wheel 24 has a greater diameter than the one of the fourth toothed wheel 28.

In an embodiment of the invention, a fifth toothed wheel 29 is coupled, preferably fixed, to the rotor 57 of the second motor 50, so as to rotate with this rotor 57. The fifth toothed wheel 29 is meshed with the ring gear 11.

In normal operation, the powertrain according to the first embodiment of the invention operates in the following manner. The crank axle 2 and the second motor 50 drives the ring gear 11. The ring gear 11 is a first input of the epicyclic gearset. The first motor 40 drives the sun gear 13, which is a second input of the epicyclic gearset. The ring gear 11 and the sun gear 13 drive the planet carrier 12, which is an output of the epicyclic gearset. The planet carrier 12 drives the output sprocket 3.

Preferably, the powertrain 1 according to the invention includes at least one one-way clutch.

In the four variants of the first embodiment of the invention illustrated in FIGS. 1 to 4, as well as in the second embodiment of the invention illustrated in the FIG. 5, the powertrain 1 includes a first one-way clutch 71 which has the function of allowing a purely mechanical power transmission from the crank axle 2 to the output sprocket 3, even if the motors 40, 50 are not running.

In the first variant of the first embodiment of the invention (FIG. 1) as well as in the fourth variant (FIG. 4), the first one-way clutch 71 is located between the crank axle 2 and the output sprocket 3. For example, the first one-way clutch 71 can be located between the first toothed wheel 22 and the third toothed wheel 24. In blocked position, the one-way clutch 71 makes the crank axle 2 attached in a fixed manner to the output sprocket 3. In free position, the output sprocket 3 is free to rotate faster than the crank axle 2.

In the second variant of the first embodiment of the invention (FIG. 2), the first one-way clutch 71 is located between the ring gear 11 and the planet carrier 12. Therefore, it allows to avoid that the planet carrier 12 rotates slower than the ring gear 11. In blocked position, the one-way clutch 71 makes the ring gear 11 attached in a fixed manner to the planet carrier 12. In free position, the planet carrier 12 is free to rotate than the ring gear 11.

In the third variant of the first embodiment of the invention (FIG. 3), the first one-way clutch 71 is located between the rotor 47 of the first motor 40 and the housing 45 of the powertrain that is fixed to the frame of the vehicle. In blocked position, the one-way clutch 71 makes the rotor 47 attached in a fixed manner to the housing 45. The rotor 47 is therefore blocked at zero speed. In free position, the rotor 47 is free to rotate faster than the housing 45.

Moreover, it is possible that the powertrain 1 according to the invention includes a second one-way clutch 72 which function is to prevent the second motor 50 from driving the crank axle 2 forward. A possible of the second one-way clutch 72 is represented in the FIG. 4. The second one-way clutch 72 is compatible with the different positions of the first one-way clutch 71 that are illustrated in the FIGS. 1 to 3.

The second one-way clutch 72 can for example be located between the first toothed wheel 22 and the crank axle 2. The second one-way clutch 72 drives the first toothed wheel 22 when the crank axle 2 is activated forward, but the first toothed wheel 22 cannot drive the crank axle 2 forward.

The second one-way clutch 72 offers more control flexibility because, thanks to it, the second motor 50 can therefore rotate without activating the crank axle 2. This allows for example, to use the motorization with the help of a throttle, without the activation of the crank by the cyclist.

The FIG. 5 illustrates a powertrain 1 according to a second embodiment of the invention. The second embodiment of the invention differs from the first embodiment of the invention mainly by the arrangement of the epicyclic gearset. The identical and similar elements in the FIGS. 5 and 1 will not be described into details hereafter.

In the second embodiment of the invention, the first gearing element is a planet carrier 12 and the second gearing element is a ring gear 11. Preferably, the planet carrier 12 includes at least one planet 16. Preferably, the ring gear 11 is meshed on the at least one planet 16. Preferably, the sun gear 13 is meshed on the at least one planet 16.

In the embodiment illustrated in the FIG. 5, a first toothed wheel 22 is coupled, preferably fixed, to the crank axle 2 so as to rotate with the crank axle 2. The first toothed wheel 22 is meshed with a second toothed wheel 23. The second toothed wheel 23 is coupled, preferably fixed, to the planet carrier 12 so as to rotate with the planet carrier 12. Preferably, the first toothed wheel 22 has a diameter greater than the one of the second toothed wheel 23.

In the embodiment illustrated in the FIG. 5, a third toothed wheel 24 is coupled, preferably fixed, to the output sprocket 3, or to hollow shaft fixed to the output sprocket 3, so as to rotate with the output sprocket 3. The third toothed wheel 24 is meshed with a fourth toothed wheel 28. The fourth toothed wheel 28 is coupled, preferably fixed, to the ring gear 11, so as to rotate with the ring gear 11. Preferably, the third toothed wheel 24 has a diameter greater than the one of the fourth toothed wheel 28.

In normal operation, the powertrain according to the second embodiment of the invention operates in the following manner. The crank axle 2 and the second motor 50 drive the planet carrier 12. The planet carrier 12 is a first input of the epicyclic gearset. The first motor 40 drives the sun gear 13, which is a second input of the epicyclic gearset. The sun gear 13 drives the planet carrier 12. The planet carrier 12 drives the ring gear 11, which is an output of the epicyclic gearset. The ring gear 11 drives the output sprocket 3.

Preferably, the powertrain 1 according to the second embodiment of the invention includes an one-way clutch 71 having as a function to allow a purely mechanical power transmission from the crank axle 2 to the output sprocket 3, even if the motors 40, 50 are not running. Preferably, the first one-way clutch 71 is located between the crank axle 2 and the output sprocket 3. It is also possible that the first one-way clutch 71 is located between the rotor of the first motor 40 and the motor housing of the first motor 40.

Moreover, the powertrain 1 according to the second embodiment of the invention can include a second one-way clutch having as a function to prevent the second motor 50 from driving the crank axle 2.

It is interesting to note that the arrangement of the powertrain according to the invention is compatible with the variants of the powertrains described in the document WO2013/160477 or with other variants of known powertrains.

Figure 6:
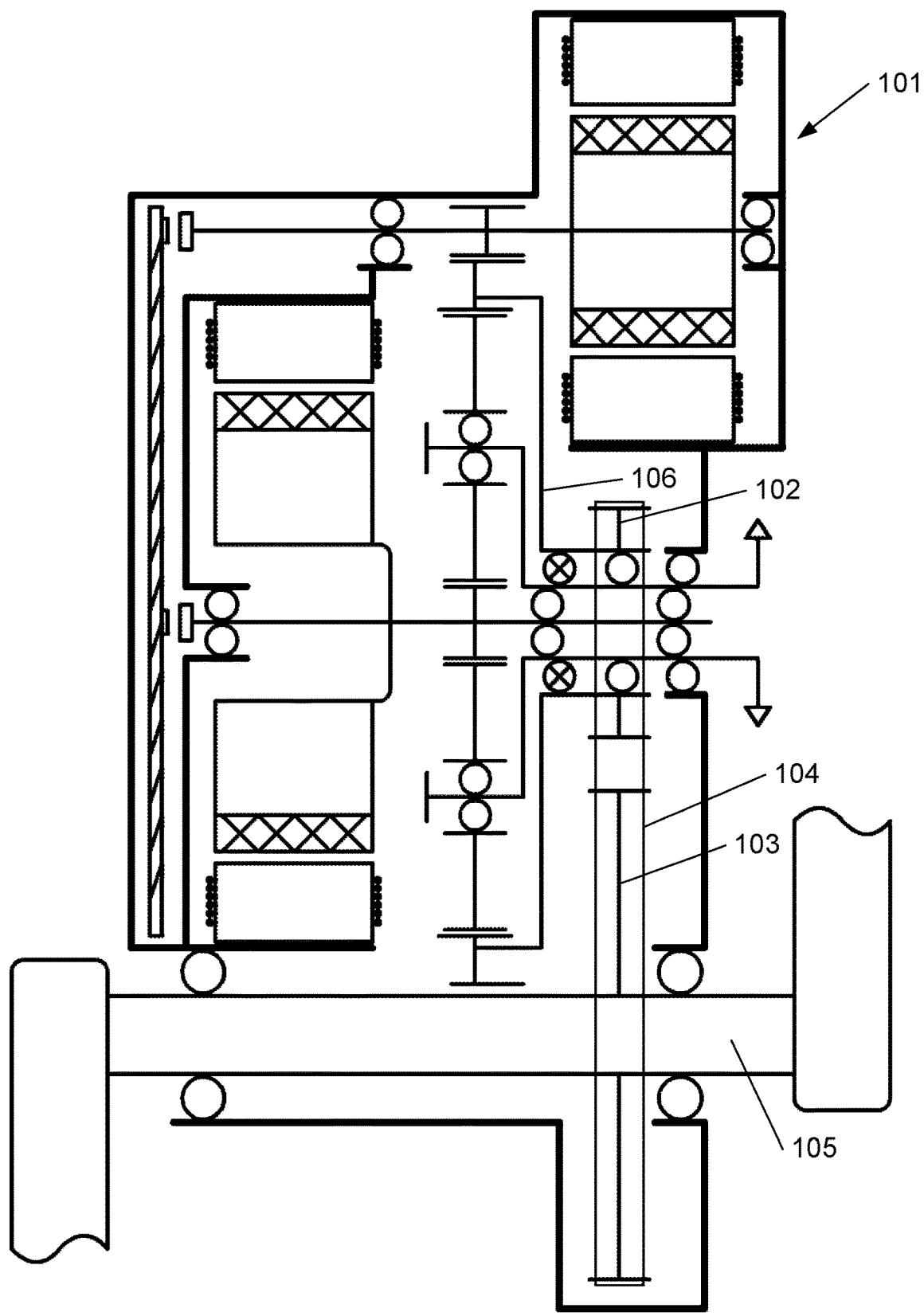
FIG. 6 illustrates another example of the powertrain.

The FIG. 6 illustrates another example of powertrain 101. This one is very similar to the powertrain described in reference to the FIG. 6 of the document WO2016/034574. A specificity of the powertrain illustrated in the FIG. 6 of the present document is that the connection between the crank axle 105 and the epicyclic gearset 106 is done via a large toothed wheel 103 and a small petite toothed wheel 102 that are coupled via a belt 104 or a chain.

In other words, the invention refers to a powertrain 1 for pedal vehicle. The powertrain 1 includes a crank axle 2 and an output sprocket 3 rotating around a first rotation axis 25. The coupling between the crank axle 2 and the output sprocket 3 pass through an epicyclic gearset including a ring gear 11, a planet carrier 12 and a sun gear 13 that rotate around a second rotation axis 15 that is spatially offset with regards to the first rotation axis 25.

The present invention has been described in relation with specific embodiments, which have a purely illustrative value and should not be considered as limiting. In general, the present invention is not limited to the examples illustrated and/or described above. The use of the verbs "comprise", "include", "contain", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

The invention claimed is:

1. A powertrain for a pedal vehicle, comprising:
   a crank axle arranged to rotate around a first rotation axis;
   an output sprocket arranged to rotate around the first rotation axis;
   a first motor;
   a second motor; and
   an epicyclic gearset including a first gearing element, a second gearing element, and a sun gear;
      wherein the crank axle and the second motor are connected to the epicyclic gearset via the first gearing element to form a first input of the epicyclic gearset,
      wherein the first motor is connected to the epicyclic gearset via the sun gear to form a second input of the epicyclic gearset,
      wherein the second gearing element connects the epicyclic gearset to the output sprocket to form an output of the epicyclic gearset,
      wherein the first gearing element, the second gearing element, and the sun gear are arranged to rotate around a same second rotation axis different from the first rotation axis,
   further comprising a first one-way clutch arranged to transmit a mechanical power transmission from the crank axle to the output sprocket, and
   wherein the first one-way clutch is between the crank axle and the output sprocket and directly connected to the output sprocket, in such a way to prevent the output sprocket from rotating slower than the crank axle.

2. The powertrain according to claim 1, wherein the first gearing element is a ring gear of the epicyclic gearset and the second gearing element is a planet carrier of the epicyclic gearset.

3. The powertrain according to claim 1, wherein the first gearing element is a planet carrier of the epicyclic gearset and the second gearing element is a ring gear of the epicyclic gearset.

4. The powertrain according to claim 1, wherein at least one of:
   the crank axle is directly meshed with the first gearing element;
   a rotor of the second motor is directly meshed with the first gearing element;
   a rotor of the first motor is attached in a fixed manner to the sun gear; or
   the second gearing element is directly meshed with the output sprocket.

5. The powertrain according to claim 1, further comprising a control unit configured to use a speed ratio parameter to control the first motor.

6. The powertrain according to claim 5, wherein the control unit is configured to determine a rotation speed setpoint and to impose the rotation speed setpoint to the first motor, the rotation speed setpoint being directly proportional to a rotation speed of the second motor acquired by an element of measurement of an angular position of the second motor and to the speed ratio parameter.

7. The powertrain according to claim 5, wherein the control unit uses the speed ratio parameter and an assistance level parameter of the powertrain to control the second motor.

8. The powertrain according to claim 7, wherein the control unit is configured to determine a current or torque setpoint and to impose the current or torque setpoint to the second motor, the current or torque setpoint being determined as directly proportional to a torque or current of the first motor acquired by an element of measurement of a current of the first motor and being determined based on the speed ratio parameter of the powertrain and on the assistance level parameter of the powertrain.

9. The powertrain according to claim 1, wherein the crank axle and the first gearing element are connected such that the first gearing element rotates faster than the crank axle.

10. The powertrain according to claim 1, wherein the output sprocket and the second gearing element are connected such that the second gearing element rotates faster than the output sprocket.

11. The powertrain according to claim 1, wherein the second motor is connected to the first gearing element such that the first gearing element rotates slower than a rotor of the second motor.

12. The powertrain according to claim 1, further comprising a printed circuit board, and wherein an element of measurement of an angular position of the first motor includes a first sensor, an element of measurement of an angular position of the second motor includes a second sensor, the first sensor and the second sensor being placed on the printed circuit board.

13. The powertrain according to claim 1, further comprising a second one-way clutch arranged to prevent a driving of the crank axle by the second motor in a rotation direction corresponding to forward movement of the pedal vehicle.

14. The powertrain according to claim 1, further comprising at least one of:
an element of measurement of an angular position of the first motor;
an element of measurement of an angular position of the second motor;
an element of measurement of a current of the first motor; or
an element of measurement of a current of the second motor.

15. The powertrain according to claim 1, further comprising a control unit connected to the first motor, and to the second motor, and being configured to control the first motor and the second motor, according to an angular position of the first motor, to an angular position of the second motor, to a current of the first motor, and to a current of the second motor, the control unit being configured to control the second motor according to a current control or to a torque control and to control the first motor according to an angular position control or an angular speed control.

16. A pedal vehicle comprising the powertrain according to claim 1.

17. A powertrain for a pedal vehicle, comprising:
a crank axle arranged to rotate around a first rotation axis;
an output sprocket arranged to rotate around the first rotation axis;
a first motor;
a second motor;
an epicyclic gearset including a first gearing element, a second gearing element, and a sun gear;
wherein the crank axle and the second motor are connected to the epicyclic gearset via the first gearing element to form a first input of the epicyclic gearset,
wherein the first motor is connected to the epicyclic gearset via the sun gear form a second input of the epicyclic gearset,
wherein the second gearing element connects the epicyclic gearset to the output sprocket to form an output of the epicyclic gearset,
wherein the first gearing element, the second gearing element, and the sun gear are arranged to rotate around a same second rotation axis different from the first rotation axis, and
a first one-way clutch arranged to transmit a mechanical power transmission from the crank axle to the output sprocket,
wherein the first one-way clutch is located between the crank axle and the output sprocket, in such a way to prevent the output sprocket from rotating slower than the crank axle,
the powertrain further comprising a control unit configured to use a speed ratio parameter to control the first motor, to use the speed ratio parameter and an assistance level parameter of the powertrain to control the second motor, and to determine a current or torque setpoint and to impose the current or torque setpoint to the second motor, the current or torque setpoint being determined as directly proportional to a torque or current of the first motor acquired by an element of measurement of a current of the first motor and being determined based on the speed ratio parameter of the powertrain and on the assistance level parameter of the powertrain.

18. A powertrain for a pedal vehicle, comprising:
a crank axle arranged to rotate around a first rotation axis;
an output sprocket arranged to rotate around the first rotation axis;
a first motor;
a second motor;
an epicyclic gearset including a first gearing element, a second gearing element, and a sun gear;
wherein the crank axle and the second motor are connected to the epicyclic gearset via the first gearing element to form a first input of the epicyclic gearset,
wherein the first motor is connected to the epicyclic gearset via the sun gear form a second input of the epicyclic gearset,
wherein the second gearing element connects the epicyclic gearset to the output sprocket to form an output of the epicyclic gearset,
wherein the first gearing element, the second gearing element, and the sun gear are arranged to rotate around a same second rotation axis different from the first rotation axis, and
a first one-way clutch arranged to transmit a mechanical power transmission from the crank axle to the output sprocket,
wherein the first one-way clutch is located between the crank axle and the output sprocket, in such a way to prevent the output sprocket from rotating slower than the crank axle,
the powertrain further comprising a second one-way clutch arranged to prevent a driving of the crank axle by the second motor in a rotation direction corresponding to forward movement of the pedal vehicle.

\* \* \* \* \*